Aug. 25, 1942.        H. SCHARFF              2,294,212

COMPACT DEVICE OR THE LIKE

Filed May 22, 1942

INVENTOR.
HENRY SCHARFF.

BY Leon M. Strauss

Patented Aug. 25, 1942

2,294,212

UNITED STATES PATENT OFFICE 2,294,212

COMPACT DEVICE OR THE LIKE

Henry Scharff, New York, N. Y.

Application May 22, 1942, Serial No. 444,073

10 Claims. (Cl. 132—79)

This invention relates to combination carrier means and holding means, and more particularly to combination mirror and lipstick holder.

It is one of the objects of the present invention to provide a simple, efficient and inexpensive implement, which is operable by one hand of a person and which comprises carrier or casing and holding means arranged in cooperative relation to one another.

It is another object of the present invention to fixedly dispose casing and holding means with respect to one another so that a lipstick when supported by said holding means and a mirror when carried by said casing and when moved by one hand of a person, may simultaneously follow one another.

It is a further object of the present invention to provide an implement or device in which casing and holding means are conjoined in such manner as to bring about displacement relatively to one another whereby said casing and holding means assume their operative positions.

It is still a further object of the present invention to provide a base or holder and a carrier or casing which faces or is contiguous to said base when in inoperative position, and is remote or averted from said base when transferred to its operative position.

Yet, another object of the present invention is to provide a holder or base to which a casing is swingably attached, which latter may be manipulated from its inoperative position in which it is closed, to its operative position in which it is automatically opened, the casing performing two different swinging movements in the course of which the casing coacts with the base for opening purpose.

Still a further object of the present invention is to provide a device having concomitant means, one of which being subordinated in its function to the other.

In general, this invention is applicable, besides to the herein mentioned lipstick and mirror combination, to different fields of industry and is capable of being developed and used for a variety of purposes, such as cigarette or cigar casing and match holder, medical or dental instrument and mirror or light source therefor or like combinations.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

Figure 2:
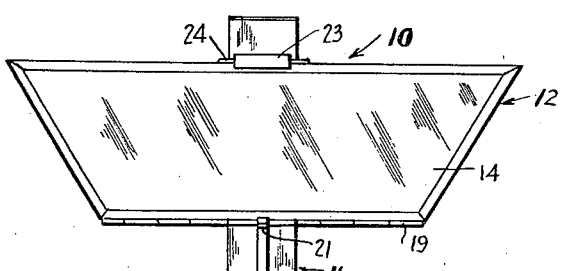
Fig. 2 is a top plan view of a device made in accordance with the invention.

Figs. 4 to 7, inclusive, illustrate side elevational views of the device shown in Fig. 2 in various stages of operation.

Figure 3:
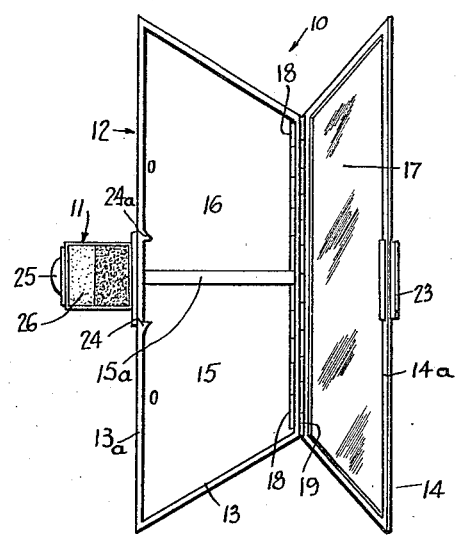
Fig. 3 is a front elevational view of the device shown in Fig. 2 in operative position.
Figure 4:
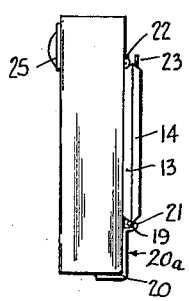
Figure 5:
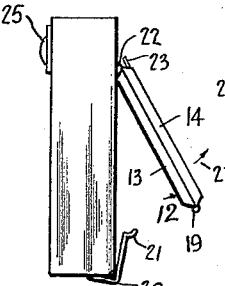

In that embodiment of the invention shown in Figs. 2 and 3 the implement or compact device 10 comprises lipstick holder or base 11 and carrier or casing 12, the latter forming the compact or vanity case proper. Casing 12 comprises lower compartment 13 and cover 14, compartment 13 being divided by partition 15a to form compartment portions 15 and 16 which may hold powder and rouge, respectively. Within the space provided by the frame 14a of cover 14, there is provided a mirror 17. Cover 14 is hinged to compartment 13 by means of spring hinge 18 and hinge 19 of known structure. Hinge 19 is adapted for engagement with a catch or release lever 20 provided on lipstick housing or holder 11, lever 20 having hook portion 21 for holding down casing 12 on lipstick holder 11, as clearly seen in Fig. 2. Casing 12 is swingably attached by means of a spring hinge 22 to lipstick holder 11 and in predetermined distance from the forward end of said lipstick holder. Cover 14 is provided at its forward end with a springedly supported latch 23 seated within the frame 14a of cover 14 and is adapted for removable engagement with lugs 24, 24a forming part of the frame 13a of compartment 13. As can be well seen in Fig. 2, casing 12 can be closed upon engagement of latch 23 with lugs 24 and 24a and can then be swung about hinge 22 for engagement with hook 21 of release or tripping lever 20.

Casing as well as holder of device 10 may be made of any suitable material, such as metal, plastic composition or the like.

Within lipstick holder 11, there is provided a lipstick proper 26 which may be moved within said holder by means of a knob 25, which is arranged to slide lengthwise of holder 11, as it is well known in the art.

It may be well realized that any operative connection may be provided between release lever 20 and knob 25, so that when knob 25 is actuated to move lipstick 26 out of holder 11, release lever 20 may be simultaneously operated to bring about disengagement of hook or catch 21 with hinge portion 19 of casing 12.

Figure 6:
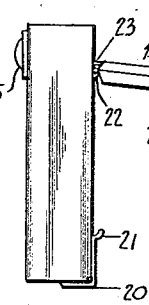
Figure 7:
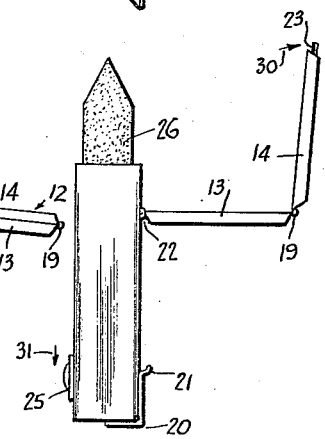

The operation of device 10 is as follows:

Upon downward pressing of lever 20 in the direction of arrow 20a (Fig. 4) against pressure of a spring (not shown) supporting lever 20, hook 21 is disengaged from hinge 19 whereby casing 12 is swung about hinge 22 in the direction of arrow 27 (Fig. 5) until spring supported latch 23 abuts against the upper surface of base or holder 11 (Fig. 6). The aforesaid latch-lug engagement is thus released (Fig. 7) thereby causing swinging movement of cover 14 in the direction of arrow 30 about hinge connection 18—19 to assume operative position or opening of casing 12, as shown in Fig. 3.

As illustrated in Figs. 4 to 7, the operation and opening of casing 12 necessitates solely the actuation of release lever 20 by one hand of the operator or user whereby cover 14 is first swung toward the forward end of and finally away from holder 11 to assume operative position (Fig. 3).

Figure 1:
Fig. 1 illustrates an embodiment of the invention in use by a person.

As seen in Fig. 1, the device 10 may be operated and moved to its open position and with lipstick 26 to its extended condition (arrow 31) by one hand only of the user. The device is so designed that while the lipstick is being applied to the lips of a person, mirror 17 of casing 12 necessarily must follow the movements of lipstick 26, thus bringing about also the fact that always sufficient light will be reflected by the mirror on the treated lips in any angular position of the mirror relatively to the lips.

It is well understood that casing 12 and holder 11 may assume any suitable shapes; however, it is suggested that casing 12 extends crosswise to holder or base 11 and that both may be so designed as to give the impression of an airplane or like form.

It is obvious that instead of casing 12 any other carrier may be provided (for example only in form of a mirror plate) which may perform a swinging movement similar to that of casing 12.

Although there has been disclosed and described in particular and considerable detail one of many possible forms of a compact device embodying the invention, many modifications in size, proportions, shape, material, and arrangements of parts may be made to arrive at the spirit and result of this invention without departing from the principles of the invention set forth in the claims.

Having thus described the invention what I claim as new and desire to secure by Letters Patent is:

1. In combination a base, a casing positioned on top of said base, catch means provided on said base and adjacent one end of said casing, spring actuated pivot means connecting the other end of said casing with said base top, said one end being engageable with said catch means to retain said casing in position on said base, and spring operated closure means at said casing and adjacent said one end thereof, whereby upon release of said catch means said casing may be moved about said pivot means to cause abutment of said closure means against said base top for automatically opening said casing.

2. In combination a base, a casing positioned on top of said base, catch means provided on said base and adjacent one end of said casing, spring actuated pivot means swingably connecting the other end of said casing with said base top, said one end being engageable with said catch means to retain said casing in position on said base, and spring operated closure means at said casing and adjacent said one end thereof, whereby upon release of said catch means said casing may be swung about said pivot means to cause abutment of said closure means against said base top for automatically opening said casing.

3. An article of the character described comprising a base, a carrier including a portion pivotally connected with said carrier, spring supported means connecting said carrier with the surface of said base, means adjacent said spring supported means and projecting from said portion, and means for releasably retaining said carrier on said surface, whereby upon release of said retaining means said carrier is moved about said spring supported means to abut with said projecting means against said surface, thus causing deviation of said portion of said carrier about said pivot connection in a direction away from said base.

4. An article of the character described comprising a base, a carrier including a portion having a pivot connecting said portion to said carrier, spring supported means swingably connecting said carrier with the surface of said base, means adjacent said spring supported means adapted to engage said portion with said carrier and projecting therebeyond, and means for releasably retaining said carrier on said surface at said pivot, whereby upon release of said retaining means said carrier together with said portion is swung about said spring supported means thereby causing abutment of said projecting means against said surface and disengagement of said portion from said carrier at said projecting means to attain swinging movement of said portion about said pivot.

5. An article of the character described comprising a base, a carrier on top of said base, a first substantially horizontal pivot means connecting said carrier to said base, a second substantially horizontal pivot means connecting a portion of said carrier to the remainder of said carrier, said portion having a projection adjacent said first pivot means, and means on said base for releasably retaining said second pivot means, whereby upon release of said retaining means said carrier together with said portion is swung about said first pivot means thereby causing abutment of said projection against said base and subsequent swinging movement of said portion about said second pivot means.

6. An article of the character described comprising a base housing, a carrier including a portion and positioned on top of said base housing, first substantially horizontal pivot means swingably connecting said carrier to said base housing, second substantially horizontal pivot means swingably connecting said portion to one end of said carrier, spring supported means for releasably engaging said portion with another end of said carrier and projecting therebeyond and adjacent said first pivot means, and means on said base housing for releasably engaging said second pivot means, whereby upon release of said second pivot means from said engagement, said carrier together with said portion may swing about said first pivot means to thereby cause abutment of said projecting spring supported means against said base housing and subsequently disengagement of said portion from said other carrier end to permit swinging movement of said portion about said second pivot means.

7. An article of the character described comprising a base housing, a carrier including a portion on top of said carrier and positioned on top of said base housing, said carrier and said portion extending crosswise to said base housing, first substantially horizontal pivot means swingably connecting said carrier to said base housing, second substantially horizontal pivot means swingably connecting said portion to one end of said carrier, spring supported means for releasably engaging said portion with another end of said carrier and projecting therebeyond and adjacent said first pivot means, and means on said base housing for releasably engaging said second pivot means, whereby upon release of said second pivot means from said engagement, said carrier together with said portion may swing about said first pivot means to thereby cause abutment of said projecting spring supported means against said base housing and subsequently disengagement of said portion from said other carrier end to permit swinging movement of said portion about said second pivot means.

8. In combination a base housing adapted to contain a lip-stick, a casing adapted to contain compact material and positioned on top of said base housing, a cover hingedly connected to said casing and carrying on the inside thereof a mirror, catch means provided on said base housing and adjacent one end of said casing, spring actuated pivot means connecting the other end of said casing with said top of said base housing, said one end of said casing being engageable with said catch means to retain said casing in inoperative position on said base housing, and spring operated closure means for releasably engaging said cover to said casing and projecting beyond said one end of said casing, whereby upon release of said catch means said casing together with said cover may be moved about said pivot means for abutment of a portion of said closure means against said base housing to thereby cause automatically opening said casing and swinging movement of said cover about said hinge connection and away from said other end of said casing.

9. A device of the character described comprising a base housing adapted to contain a lipstick, a casing adapted to contain compact material and positioned on top of said base housing, a cover for said casing and carrying on the inner face thereof a mirror, spring actuated pivot means hingedly connecting said cover to said casing, spring actuated hinge means connecting said casing with said base housing, catch means arranged for releasably engaging with said pivot means to retain said casing in inoperative position on said base housing, and spring operated closure means for releasably engaging said cover with said casing and projecting adjacent said pivot means, whereby upon release of said catch means said casing together with said cover may move about said hinge means and abut with said closure means against said base housing thereby causing release of said closure means of said cover and swinging movement of said cover about said pivot means into operative position, in which said mirror at said inner face of said cover is exposed to view.

10. An article of the character described comprising a lipstick containing housing, a carrier including a mirror holding portion, said mirror holding portion being located above the surface of said housing and being arranged to face the latter in its inoperative position, first substantially horizontal and spring actuated pivot means swingably connecting said carrier to said housing, second substantially horizontal and spring actuated pivot means swingably connecting said portion to said carrier, spring operated means for releasably engaging said portion with said carrier and projecting beyond the latter and adjacent said first pivot means, and means for releasably retaining said second pivot means on said surface, whereby upon release of said second pivot means from said engagement with said retaining means, said carrier together with said portion may swing about said first pivot means thereby causing abutment of said projecting spring operated means against said housing subsequent release from engagement of said portion with said carrier and swinging movement of said portion about said second pivot means into operative position, in which said mirror holding portion assumes a position averted from said housing.

HENRY SCHARFF.